United States Patent Office 3,290,379
Patented Dec. 6, 1966

3,290,379
SELECTIVE HYDROFORMYLATION OF OLEFINIC COMPOUNDS
John L. Eisenmann, Braintree, Mass., assignor, by mesne assignments, to Diamond Alkali Company, Cleveland, Ohio, a corporation of Delaware
No Drawing. Filed Sept. 1, 1961, Ser. No. 135,450
4 Claims. (Cl. 260—604)

This application relates to the production of aldehydes by the catalytic hydroformylation of olefins and, more particularly, to the selective hydroformylation of certain olefins to the exclusion of certain other olefins contained in the reaction mixture.

In my copending application, Serial No. 23,620, filed April 2, 1960, there is disclosed a process wherein an olefin may be converted to an aldehyde by a hydroformylation reaction to the substantial exclusion of formation of any alcohol. In accordance with the teachings of the aformentioned application, if the hydroformylation is carried out in a solution containing a metal carbonyl catalyst and an aromatic phosphite, substantially only the aldehyde is formed. The aromatic phosphite modifies the metal carbonyl catalyst, thereby making the thus modified metal carbonyl catalyst selective for the formation of aldehydes. The unmodified metal carbonyl is a well-known hydroformylation catalyst and when used in the unmodified form, a mixture of aldehydes and alcohols having one more carbon atom than the initial olefinic starting material is formed. The essence of the invention described in the aforementioned application is thus the hydroformylation of an olefin with a metal carbonyl catalyst and an aromatic phosphite catalyst modified to produce aldehydes to the substantial exclusion of alcohols.

I have now found, quite surprisingly, that a metal carbonyl catalyst modified with an aromatic phosphite in the above manner permits selective hydroformylation to form only certain aldehydes to the exclusion of others which are normally formed when conventional hydroformylation techniques with unmodified catalysts are utilized. This discovery is particularly useful in hydroformylation reactions involving a mixture of certain branched chain or "hindered" olefinic compounds, described more specifically hereinafter, and "unhindered" olefinic compounds, such as, for example, straight chain olefinic compounds, wherein it is desired to obtain and isolate only the aldehyde derived from the "unhindered" olefinic compound. This discovery is further of particular use in hydroformylation of a single "hindered" olefinic compound, as distinguished from a mixture including such compounds, wherein it is desired to obtain a single aldehyde rather than the isomeric mixture of aldehydes heretofore obtained by known hydroformylation processes utilizing conventional catalysts.

It is therefore one object of the invention to prepare certain aldehydes to the exclusion of others by hydroformlyation of olefinic compounds.

Another object of this invention is to form selectively only the aldehyde derived from a portion of a mixture of two or more olefinic compounds.

Yet another object is to provide a process for preparing substantially only straight or essentially straight chain aldehydes from mixtures comprising both branched chain olefinic compounds and straight or essentially straight chain olefinic compounds.

Still another object of the invention is to selectively obtain only certain aldehydes by hydroformylation of polyunsaturated olefinic compounds.

A further object is to provide a modified hydroformylation catalyst which will permit synthesis of only certain aldehydes to the exclusion of isomers thereof heretofore obtained by known hydroformylation processes.

Other objects of the invention will in part be obvious and will in part appear hereinafter.

The hydroformylation reaction, also referred to as the "oxo reaction," whereby olefinic compounds are converted to aldehydes of one more carbon atom than the starting material is, of course, well known in the art. The conventional reaction, which takes place at elevated temperatures and superatmospheric pressures, may be illustrated by the following general equation:

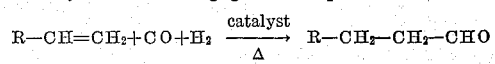

wherein R represents the atoms necessary to complete the olefinic compound usually an alkyl radical.

As will be appreciated by those skilled in the art, the formyl group may attach to any and all of the double-bonded carbon atoms, and the above equation is only by way of illustration.

The reaction between the olefinic compound, carbon monoxide, and hydrogen is generally conducted at temperatures in the range of about 110° C. to 350° C. and preferably between about 140° C. and 200° C. The process is carried out at superatmospheric pressures and preferably at superatmospheric pressures in excess of 200 and up to 500 atmospheres.

The relative proportions of reactants may be stoichiometric but other molar ratios may be employed such as when the olefin:CO:H$_2$ ratio is within the range of about 1:1:1 to about 1:5:10. Excess hydrogen is not always necessary.

The olefinic compounds used as the starting materials, such as, for example, alkenes, are often available only in isomeric mixtures. In other words, where it is desired to prepare a particular aldehyde by well-known hydroformylation techniques, the starting material from which the desired aldehyde is obtained may be available only in mixtures containing various branched chain isomers. These branched chain isomers may be present in significant amounts. Where the hydroformylation reaction is carried out by prior art techniques and with known hydroformylation catalysts, such as dicobalt octacarbonyl, not only are some alcohols formed, but also formed are the aldehydes derived from the various branched chain isomers. The last-mentioned reaction products, which may be unwanted, are separated from the desired aldehyde only with great difficulty, if they can be separated at all, since the various aldehydes so formed often have similar boiling points and solubility characteristics in various organic solvents. Thus, conventional fractional distillation procedures and/or selective solvent or solvent crystallization processes, etc., for separating mixtures of compounds are difficult, if not impossible. Moreover, as will be apparent to those skilled in the art, the various branched chain olefinic materials or the aldehydes derived therefrom, may, in fact, have separate utility in pure form, either as such or as starting materials or intermediates in the preparation of other useful compounds.

By the process of this invention, straight or relatively straight chain aldehydes may be obtained from mixtures of olefinic materials and the unreacted olefinic materials remaining in the mixture may then also be isolated or subsequently subjected to further chemical reactions, such as a second hydroformylation reaction, to obtain useful derivatives thereof.

The present invention is therefore particularly useful to selectively effect hydroformylation of only the unhindered or slightly hindered olefinic compounds present in a mixture of olefinic compounds.

As used herein, the term "olefinic compounds" includes not only alkenes, but the various derivatives thereof, such as alcohols, esters, ethers, etc., containing at least one double bonded carbon to carbon linkage. These olefinic compounds may be either mono or polyunsaturated.

The expression "unhindered olefinic compound" denotes straight chain olefinic compounds, or those containing branch chains separated from the olefinic linkage by at least two carbon atoms whereby addition of a hydrogen atom and a formyl group onto the double bond is not hindered.

The term "slightly hindered olefinic compound," as used herein, denotes a branched chain olefinic compound which will not undergo the hydroformylation reaction with the modified catalyst of this invention at temperatures up to about 125° C., but will undergo hydroformylation at higher temperatures. Slightly hindered olefinic compounds may, but do not necessarily have to have a branch chain in a position alpha or beta to the double bond. As used herein, the term "alpha to the double bond" refers to a double-bonded carbon atom; while the term "beta to the double bond" refers to the carbon atom or atoms adjacent or directly attached to a double-bonded carbon atom. As examples of slightly hindered olefinic compounds, mention may be made of isobutylene, 2-methyl-1-butene, 3-ethyl-4-methyl-1-pentene, isoprene, etc.

The term "highly hindered olefinic compound" as used herein denotes a branched chain olefinic compound which will not undergo hydroformylation with the modified catalyst of this invention even at greatly elevated temperatures, say, for example, 225° C. Highly hindered olefinic compounds usually, but not necessarily, contain two or more branch chains of one or more carbon atoms, at least one of said chains being in a position alpha or beta to the double bond. As examples of such compounds, mention may be made of diisobutylene, tripropylene, etc.

The hydroformylation process of the present invention is thus, in its broadest aspects, predicated upon the ability of a metal carbonyl catalyst modified with an aromatic phosphite to distinguish catalytically between (1) unhindered olefinic compounds, that is, straight chain olefinic compounds or those which contain one or more branch chains separated from the olefinic linkage by at least two carbon atoms whereby addition of a formyl group onto the double bond is not hindered; (2) slightly hindered olefinic compounds, that is those branched chain olefinic compounds which will not undergo hydroformylation at temperatures up to about 125° C.; and (3) highly hindered olefinic compounds, that is, those branched chain olefinic compounds which will not undergo hydroformylation at elevated temperatures, even temperatures greatly in excess of 125° C.

It should be noted that, while the slightly hindered and highly hindered olefinic compounds will not per se undergo hydroformylation under the conditions described above, at least some aldehydes may be formed due to isomerization of the double bond. In other words, if an olefin such as 1-hexene is subjected to conventional hydroformylation, due to isomerization or a "shifting" of the double bond, the formyl group may attach to any one of the six carbon atoms to form, at least to some extent, the various isomers of heptanal. In like manner, if a "slightly hindered" olefinic compound such as 2-methyl-1-hexene is subjected to hydroformylation conditions at a temperature below about 125° C. with the modified catalyst of this invention, while the starting compound will not per se undergo hydroformylation, some small amount of aldehyde may be recovered due to an isomeric shift of the double bond to an unhindered position, thereby permitting addition of the formyl group. Thus, in order for the hindered olefinic compound to be completely unreactive to the extent that isomeric aldehydes are precluded from formation, shifting of the double bond to an unhindered position must be precluded. Such isomeric shifting of the double bond to an unhindered position can only occur with primary chains of five or more carbon atoms, as will be apparent. With hindered olefinic compounds having five or more carbon atoms in the primary or main chain, shifting of the double bond to an unhindered position may be precluded by other unsaturated linkages or by various substituents alpha or beta to the respective carbon atoms of the olefinic compound.

The nature and application of the present invention to the preparation of aldehydes from olefinic compounds will be more apparent from the following detailed description and examples.

In one embodiment of the present invention, a mixture comprising both unhindered and slightly hindered olefinic compounds is subjected to the hydroformylation reaction in the presence of a cobalt carbonyl catalyst modified with an aromatic phosphite catalyst modifier at an elevated temperature below about 125° C. and at conventional hydroformylation pressures, preferably superatmospheric pressures of 3000–4000 p.s.i. Only the unhindered olefinic compounds are converted to aldehydes, the slightly hindered olefinic compounds remaining unreacted. At temperatures beyond about 125° C., it has been found that both unhindered and slightly hindered olefinic compounds will undergo hydroformylation. While slightly hindered olefinic compounds will undergo hydroformylation at temperatures above about 125° C., it has been found, however, that the hydroformylation is still selective to the extent that the formyl group will preferentially attach to an unhindered position, if any, or, alternatively, if there are no unhindered positions, then in a position beta to the hindering group, that is, to an unsubstituted carbon atom separated from the hindering branch chain by one other unsubstituted carbon atom. In other words, even though slightly hindered olefinic compounds will undergo hydroformylation with the modified catalyst at temperatures above about 125° C., the hydroformylation will take place selectively at a carbon atom which is itself unsubstituted and is in turn separated from the hindering group by at least one another unsubstituted carbon atom. The selective hydroformylation of slightly hindered olefinic compounds at temperatures above about 125° C. will be described and illustrated with more particularity subsequently in connection with another embodiment of this invention.

The reaction is carried out in an inert solvent, that is, a solvent which is inert to the reactants, the catalyst and the hydroformylation products. Inert solvents of this nature are well known to those skilled in the art. As illustrations of useful inert solvents, mention may be made of aromatic hydrocarbons such as benzene, xylene, toluene, and their derivatives, saturated aliphatic hydrocarbons such as pentanes, naphtha, kerosine, mineral oils, etc.; saturated alicyclic hydrocarbons such as cyclohexane, cyclopentane, etc., as well as the ethers, esters, etheresters, etc., may also be used.

The aromatic phosphite catalyst modifier used to modify the cobalt carbonyl catalyst may be, for example, triphenyl phosphite, bis(p-tolylphenyl) phosphite, diphenyl phosphite, trinaphthyl phosphite, and nuclear substituted derivatives thereof, or coordination compounds of aromatic phosphites, such as bis(triphenyl phosphite) chromium tetracarbonyl and the like.

As examples of carbonyl catalysts useful in the practice of this invention, mention may be made of dimetallic octacarbonyls such as dicobalt octacarbonyl, dirhodium octacarbonyl and diiridium octacarbonyl, the preferred catalyst being dicobalt otcacarbonyl.

The metal carbonyl such as, for example, cobalt carbonyl, may be modified in situ, that is, by dissolving the olefinic mixture, the cobalt carbonyl catalyst and the aromatic phosphite modifier in an inert solvent. Alternatively, the modified catalyst may be prepared, by dissolving the modifier and the catalyst in an inert solvent and then recovering the modified catalyst in solid form. The thus recovered modified catalyst may be stored or used at such subsequent time as may be desired.

The following examples show by way of illustration and not by way of limitation the embodiment wherein the modified catalyst is utilized with a reaction mixture containing unhindered and slightly hindered olefinic compounds.

EXAMPLE 1

One gram of dicobalt octacarbonyl and four grams of triphenyl phosphite were dissolved in 75 ml. of benzene and the resulting solution was then placed in a 250 ml. autoclave. 0.25 mole of 1-butene and 0.25 mole of 2-methyl-2-butene were then added, after which the autoclave was brought to a pressure of 3600 p.s.i. by the addition of carbon monoxide and hydrogen in a ratio of 1:1 and heated to 125° C. From the reaction mixture there was recovered a 60% yield of valeraldehyde and 2-methylbutyraldehyde (from hydroformylation of 1-butene only), plus unreacted 2-methyl-2-butene.

The above example illustrates the selective hydroformylation of only an unhindered olefinic compound (1-butene) from a mixture of such a compound and a slightly hindered olefinic compound (2-methyl-2-butene).

EXAMPLE 2

The above reaction was repeated at a temperature of 140° C. Analysis of the reaction mixture showed that the 2-methyl-2-butene underwent hydroformylation, along with the 1-butene, to yield a mixture of 5 and 6 carbon aldehydes.

Example 2 illustrates how both the unhindered and the slightly hindered olefinic compounds contained in a mixture of olefinic compounds may be induced to undergo hydroformylation with the modified catalyst by raising the temperature of the reaction above about 125° C. It has been found that the rate of reaction of the slightly hindered olefinic compound is slow at temperatures only slightly in excess of 125° C. Thus, in order to obtain hydroformylation in satisfactory yield, a temperature considerably in excess of 125° C., say for example 140° C. or higher, is preferably employed.

In another embodiment of the invention, the modified catalyst is utilized to selectively hydroformylate mixtures containing either or both unhindered and slightly hindered olefinic compounds and highly hindered olefinic compounds. This embodiment of the invention makes use of my discovery that highly hindered olefins will not undergo hydroformylation in the presence of the modified catalyst, even at greatly elevated temperatures. It is to be noted, therefore, that highly hindered olefinic compounds differ in this respect from slightly hindered olefinic compounds, the latter class of compounds undergoing hydroformylation at temperatures of about 125° C. or greater.

Therefore, in accordance with this embodiment of the invention, unhindered olefinic compounds may be selectively hydroformylated from mixtures containing highly hindered olefinic compounds by hydroformylation procedures with the modified catalyst at any desired hydroformylation temperature and pressure. Slightly hindered olefinic compounds may be selectively hydroformylated either alone or along with unhindered olefinic compounds by hydroformylation processes utilizing the modified catalyst at temperatures of 125° C. or greater. It should also be appreciated that unhindered olefinic compounds may be selectively hydroformylated from mixtures containing both slightly and highly hindered olefinic compounds by carrying out the reaction at temperatures lower than about 125° C. Alternatively, a mixture comprising unhindered, slightly hindered, and highly hindered olefinic compounds may be subjected to a first hydroformylation reaction at temperatures below about 125° C. with the modified catalyst; a second hydroformylation reaction with the modified catalyst at temperatures above 125° C. with the modified catalyst; and a third hydroformylation reaction with a conventional or unmodified catalyst to recover respectively, the aldehyde from the unhindered olefinic compound, the aldehyde from the slightly hindered olefinic compound, and the aldehyde from the highly hindered olefinic compound.

The following examples show by way of illustration and not by way of limitation the embodiment wherein the modified catalyst is utilized with a reaction mixture containing highly hindered olefinic compounds.

EXAMPLE 3

A mixture of equal parts by weight of 1-butene, 2-methyl-2-butene and diisobutylene were subjected to hydroformylation under the reaction conditions described in Example 1. Analysis of the reaction mixture indicated a 56% yield of valeraldehyde and 2-methylbutyraldehyde, plus unreacted 2-methyl-2-butene and diisobutylene.

The above example illustrates the selective hydroformylation of only the unhindered olefinic compound (1-butene) present in an olefinic mixture including a slightly hindered olefinic compound (2-methyl-2-butene) and a highly hindered olefinic compound (diisobutylene).

EXAMPLE 4

The above reaction was repeated at a temperature of 225° C. Analysis of the reaction mixture showed that while the 1-butene and 2-methyl-2-butene underwent hydroformylation to form the respective isomeric mixtures of 5 and 6 carbon aldehydes, the diisobutylene was still unreacted and recoverable from the reaction mixture.

It should be appreciated that the unreacted olefinic compounds, that is, the hindered olefinic compounds which did not undergo hydroformylation in the presence of the modified cobalt carbonyl catalyst, may be recovered from the reaction mixture as such, or subjected to any desired chemical treatment. For example, a solution of these unreacted olefinic compounds and a conventional hydroformylation catalyst, such as dicobalt octacarbonyl may be formed, and a second hydroformylation reaction carried out in conventional manner according to techniques well known in the art. The novel hydroformylation process of this invention therefore affords the additional advantage of enabling isolation and recovery of branched chain olefinic compounds from mixtures such as mixtures of isomeric olefinic compounds, and it further permits the recovery of reaction products of these hindered olefinic compounds in substantially pure form from such mixtures.

In a still further embodiment of the invention, the modified catalyst is employed to effect selective hydroformylation of polyunsaturated branch chained olefinic compounds, such as alkadienes having either an unhindered olefinic linkage or, alternatively, a branch chain alpha to at least one, but not all, of the double bonds. As an illustration of such compounds, mention may be made of conjugated alkadienes such as isoprene (2-methyl-1,3-butadiene).

When polyunsaturated olefins such as those described above are subjected to hydroformylation with conventional catalysts, the formyl group may attach to any of the double bonds, the remaining double bond or bonds being hydrogenated to form the various isomeric aldehyde derivatives having one more carbon atom than the starting material.

In accordance with this embodiment of the invention, it is possible to selectively effect addition of the formyl group to but one of a plurality of the double bonds in a polyunsaturated olefinic compound.

The following example shows by way of illustration and not by way of limitation the embodiment wherein the modified catalyst is utilized with polyunsaturated branched chain olefinic compounds.

EXAMPLE 5

One gram of dicobalt octacarbonyl and four grams of triphenyl phosphite were dissolved in 75 ml. of toluene in a 250 ml. autoclave. The autoclave was flushed with nitrogen and 17 grams of isoprene were added. The autoclave was then brought to a pressure of 3600 p.s.i. by charging it with carbon monoxide and hydrogen in a ratio of 1:1, and the autoclave was heated to 160° C. for one hour, after which it was cooled and vented. Distillation of the reaction mixture gave a 62% yield of 4-methylvaleraldehyde as the only aldehyde product.

The above example illustrates how a polyunsaturated olefinic compound may be selectively hydroformylated with the modified catalyst in accordance with the teachings of this invention. The formyl group will preferentially attach to the unhindered olefinic linkage or linkages or to an unsubstituted carbon atom separated from a hindering group by another unsubstituted carbon atom, the hindered linkage or linkages being hydrogenated. In the case of a diolefinic compound, this in turn results in the selective hydroformylation of the diolefinic compound to form but a single aldehyde. As was indicated previously, if the hydroformylation is conducted by known processes utilizing conventional catalysts, the formyl group will attach to either of the double bonds to yield an isomeric mixture of aldehydes.

It should be noted that Example 5 further illustrates how a slightly hindered olefinic compound will selectively hydroformylate at temperatures above about 125° C. In other words, 2-methyl-1,3-butadiene, is a slightly hindered olefinic compound within the definition heretofore given, the methyl branch chain being alpha to one double bond and beta to the other. At temperatures above about 125° C., hydroformylation will occur, but selectively at an unsubstituted carbon atom separated from the hindering methyl substituent by at least one other unsubstituted carbon atom, thereby forming but a single aldehyde.

It should be appreciated from the foregoing detailed description of several embodiments of the invention heretofore mentioned that it is also within the scope of the invention to utilize the modified catalyst to form only certain aldehydes from a single hindered olefinic compound. For example, if any of 3-methyl-1-butene, 2-methyl-2-butene, and 2-methyl-1-butene are hydroformylated in conventional manner, a mixture of 4-methyl-valeraldehyde and the isomers thereof is formed, due to the isomeric shifting of the double bond. If, on the other hand, the hydroformylation reaction is carried out with the present modified catalyst and at a temperature above about 125° C., each of the above-mentioned compounds will yield 4-methylvaleraldehyde as the only aldehyde. This is due to the fact that, as previously indicated, each of the aforementioned slightly hindered olefinic compounds will selectively undergo hydroformylation at temperatures above about 125° C. at an unsubstituted carbon atom separated from the hindering group by at least one other unsubstituted carbon atom. Thus, of the various compounds formed by isomeric shifting of the double bond, only 3-methyl-1-butene will undergo hydroformylation, thereby producing but a single aldehyde, 4-methylvaleraldehyde.

The following example illustrates this embodiment of the invention.

EXAMPLE 6

One gram of dirhodium octacarbonyl and four grams of triphenyl phosphite were dissolved in 75 ml. of benzene as in Example 5. A mixture of 3-methyl-1-butene, 2-methyl-2-butene and 2-methyl-1-butene totaling .25 mole was added and the autoclave was brought to a pressure of 3600 p.s.i. by charging it with carbon monoxide and hydrogen in a ratio of 1:1. The autoclave was then heated to 140° C. for two hours, cooled and vented. Analysis showed 4-methylvaleraldehyde as the only reaction product.

What is claimed is:

1. A method for the preparation of aldehydes by the selective hydroformylation of olefins which comprises contacting with carbon monoxide and hydrogen,
   (A) at a temperature below about 125° C. and a pressure between about 200 and 500 atmospheres,
   (B) in the presence of (1) a catalyst selected from the group consisting of dicobalt, dirhodium and diiridium octacarbonyls and (2) a catalyst modifier selected from the group consisting of diaryl phosphites, triaryl phosphites and bis-(triaryl phosphite) chromium tetracarbonyl,
   (C) a mixture of aliphatic olefinic compounds comprising (3) at least one olefinic compound selected from the group consisting of straight-chain olefinic compounds and olefinic compounds containing branch chains separated from the olefinic linkage by at least two carbon atoms, and (4) at least one olefinic compound which nomrally forms an aldehyde when conventional hydroformylation techniques with unmodified catalysts are utilized and which contains at least one side chain attached to a carbon atom no more than one position removed from the olefinic double bond;
   (D) thereby selectively forming the aldehyde from said olefinic (3) and leaving said olefin (4) unreacted.

2. The method of claim 1 wherein the catalyst (1) is dicobalt octacarbonyl and the catalyst modifier (2) is triphenyl phosphite.

3. A method for the preparation of aldehydes by the selective hydroformylation of olefins which comprises contacting with carbon monoxide and hydrogen,
   (A) at a temperature between about 125° and 225° C. and a pressure between about 200 and 500 atmospheres,
   (B) in the presence of (1) a catalyst and (2) a catalyst modifier as defined in claim 1,
   (C) a mixture of aliphatic olefinic compounds comprising (3) at least one olefinic compound which contains one and only one side chain, said side chain being attached to a carbon atom no more than one position removed from the olefinic double bond, and (4) at least one olefinic compound which normally forms an aldehyde when conventional hydroformylation techniques with unmodified catalysts are utilized and which contains at least two side chains, at least one of which is attached to a carbon atom no more than one position removed from the olefinic double bond;
   (D) thereby selectively forming the aldehyde from said olefin (3) and leaving said olefin (4) unreacted.

4. The method of claim 3 wherein the catalyst (1) is dicobalt octacarbonyl and the catalyst modifier (2) is triphenyl phosphite.

References Cited by the Examiner

UNITED STATES PATENTS

| 2,625,527 | 1/1953 | Smith et al. | 260—638 |
| 3,150,188 | 9/1964 | Eisenmann et al. | 260—604 |

FOREIGN PATENTS

| 614,010 | 12/1948 | Great Britain. |
| 638,754 | 6/1950 | Great Britain. |

OTHER REFERENCES

Enjay, Higher Oxo Alcohols, 1957, pp. 6–13 and 18.
Hieber et al., Chemical Abstracts, vol. 52 (1958), pages 20146–20147.

LEON ZITVER, *Primary Examiner.*

J. J. SETELIK, B. HELFIN, R. H. LILES,
*Assistant Examiners.*